United States Patent
Polo et al.

(10) Patent No.: US 9,706,496 B2
(45) Date of Patent: Jul. 11, 2017

(54) CONCURRENT BLE SCANNING AND INITIATION FOR BANDWIDTH EFFICIENCY AND POWER SAVING

(75) Inventors: Angel Polo, Solana Beach, CA (US);
Yuan Zhuang, San Diego, CA (US);
Chikan Kwan, San Diego, CA (US);
Guoxin Xie, San Diego, CA (US);
Arthur Jin, San Diego, CA (US);
Cindy (Xin) Tian, San Diego, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 1203 days.

(21) Appl. No.: 13/286,018

(22) Filed: Oct. 31, 2011

(65) Prior Publication Data

US 2013/0109315 A1  May 2, 2013

(51) Int. Cl.
*H04B 5/00* (2006.01)
*H04W 52/02* (2009.01)
*H04W 4/00* (2009.01)

(52) U.S. Cl.
CPC ....... *H04W 52/0274* (2013.01); *H04W 4/008* (2013.01); *Y02B 60/50* (2013.01)

(58) Field of Classification Search
USPC ......... 455/455–456, 550.1, 343.6, 41.1–41.3
See application file for complete search history.

(56) References Cited

U.S. PATENT DOCUMENTS

| | | | | |
|---|---|---|---|---|
| 7,215,649 B2* | 5/2007 | Yu | ................ | H04M 1/7253 370/257 |
| 7,359,674 B2* | 4/2008 | Markki | ................ | H04W 48/08 370/313 |
| 7,426,403 B2* | 9/2008 | Sundararajan | ....... | G01C 21/005 370/310 |
| 7,436,300 B2* | 10/2008 | Glass | ................ | G06F 21/31 340/568.1 |
| 7,583,625 B2* | 9/2009 | Bennett | ................ | H04W 52/24 370/311 |
| 2003/0147424 A1 | 8/2003 | Famolari | | |
| 2011/0021142 A1 | 1/2011 | Desai et al. | | |
| 2012/0195387 A1* | 8/2012 | Masuda | ............. | H04M 1/7253 375/259 |
| 2013/0040574 A1* | 2/2013 | Hillyard | ............... | H04W 8/005 455/41.2 |
| 2013/0090061 A1* | 4/2013 | Linde | ............ | 455/41.2 |
| 2013/0109315 A1* | 5/2013 | Polo | ........... | H04W 52/0274 455/41.2 |

OTHER PUBLICATIONS

European Patent Office; European Search Report; EP Application No. 12006726; Aug. 31, 2015; 3 pgs.

* cited by examiner

*Primary Examiner* — Edward Urban
*Assistant Examiner* — Max Matthew
(74) *Attorney, Agent, or Firm* — Garlick & Markison; Randy W. Lacasse

(57) ABSTRACT

A technique to open a single receiving window to perform scanning and initiating operations in a Bluetooth Low Energy compliant device, instead of using two separate receiving windows to perform the equivalent operations. The combining of the scanning and initiating operations in one receiving window, instead of two separate windows, reduces power consumption and provides for bandwidth efficiency.

20 Claims, 14 Drawing Sheets

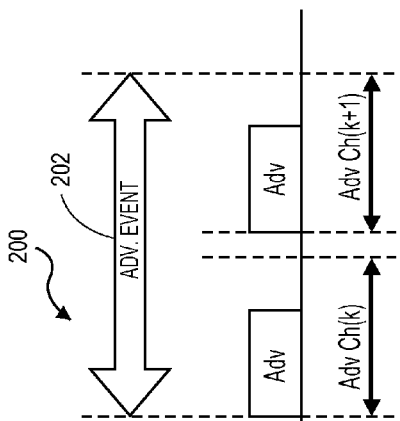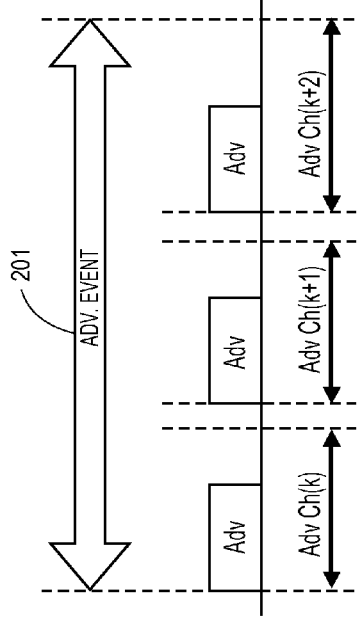
FIG. 5
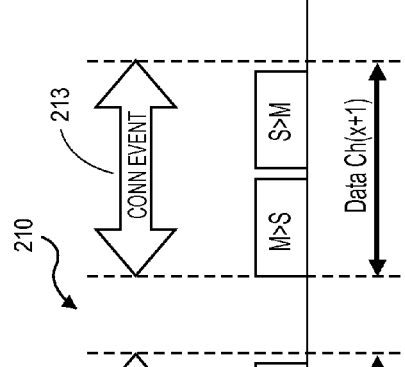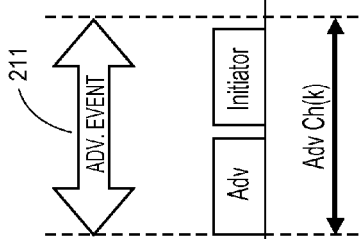
FIG. 6

Active Scan / Non-Directed Adv. Packet

| Peer Match | Init Match | Init WL Match | Scan WL Match | Expected Result |
|---|---|---|---|---|
| Yes | N/A | Yes | Yes | Conn Req |
| Yes | N/A | Yes | No | Conn Req |
| Yes | N/A | No | Yes | Scan Req |
| Yes | N/A | No | No | Error |
| No | N/A | Yes | Yes | Conn Req |
| No | N/A | Yes | No | Conn Req |
| No | N/A | No | Yes | Scan Req |
| No | N/A | No | No | Error |
| Yes | N/A | Dis | Yes | Conn Req |
| Yes | N/A | Dis | No | Conn Req |
| No | N/A | Dis | Yes | Scan Req |
| No | N/A | Dis | No | Error |
| Yes | N/A | Yes | Dis | Conn Req |
| Yes | N/A | No | Dis | Conn Req |
| No | N/A | Yes | Dis | Scan Req |
| No | N/A | No | Dis | Error |
| Yes | N/A | Dis | Dis | Conn Req |
| No | N/A | Dis | Dis | Conn Req |

FIG. 11A

Active Scan / Directed Adv. Packet

| Peer Match | Init Match | Init WL Match | Scan WL Match | Expected Result |
|---|---|---|---|---|
| Yes | Yes | Yes | Yes | Conn Req |
| Yes | Yes | Yes | No | Conn Req |
| Yes | Yes | No | Yes | No scan req/No Error |
| Yes | Yes | No | No | Error |
| Yes | No | Yes | Yes | Error |
| Yes | No | Yes | No | Error |
| Yes | No | No | Yes | Error |
| Yes | No | No | No | Error |
| No | Yes | Yes | Yes | Conn Req |
| No | Yes | Yes | No | Conn Req |
| No | Yes | No | Yes | No scan req/No Error |
| No | Yes | No | No | Error |
| No | No | Yes | Yes | Error |
| No | No | Yes | No | Error |
| No | No | No | Yes | Error |
| No | No | No | No | Error |
| Yes | Yes | Dis | Yes | Conn Req |
| Yes | Yes | Dis | No | Conn Req |
| Yes | No | Dis | Yes | Error |
| Yes | No | Dis | No | Error |
| No | Yes | Dis | Yes | No scan req/No Error |
| No | Yes | Dis | No | Error |
| No | No | Dis | Yes | Error |
| No | No | Dis | No | Error |
| Yes | Yes | Dis | Dis | Conn Req |
| No | Yes | Dis | Dis | No scan req/No Error |
| Yes | No | Dis | Dis | Error |
| No | No | Dis | Dis | Error |
| Yes | Yes | Yes | Dis | Conn Req |
| Yes | Yes | No | Dis | No scan req/No Error |
| Yes | No | Yes | Dis | Error |
| Yes | No | No | Dis | Error |
| No | Yes | Yes | Dis | Conn Req |
| No | Yes | No | Dis | No scan req/No Error |
| No | No | Yes | Dis | Error |
| No | No | No | Dis | Error |

FIG. 11B

Passive Scan / Non-Directed Adv. Packet

| Peer Match | Init Match | Init WL Match | Scan WL Match | Expected Result |
|---|---|---|---|---|
| Yes | N/A | Yes | Yes | Conn Req |
| Yes | N/A | Yes | No | Conn Req |
| Yes | N/A | No | Yes | No scan req/No Error |
| Yes | N/A | No | No | Error |
| No | N/A | Yes | Yes | Conn Req |
| No | N/A | Yes | No | Conn Req |
| No | N/A | No | Yes | No scan req/No Error |
| No | N/A | No | No | Error |
| Yes | N/A | Dis | Yes | Conn Req |
| Yes | N/A | Dis | No | Conn Req |
| No | N/A | Dis | Yes | No scan req/No Error |
| No | N/A | Dis | No | Error |
| Yes | N/A | Yes | Dis | Conn Req |
| Yes | N/A | No | Dis | No scan req/No Error |
| No | N/A | Yes | Dis | Conn Req |
| No | N/A | No | Dis | No scan req/No Error |
| Yes | N/A | Dis | Dis | Conn Req |
| No | N/A | Dis | Dis | No scan req/No Error |

FIG. 11C

| Passive Scan / Directed Adv. Packet | | | | |
|---|---|---|---|---|
| Peer Match | Init Match | Init WL Match | Scan WL Match | Expected Result |
| Yes | Yes | Yes | Yes | Conn Req |
| Yes | Yes | Yes | No | Conn Req |
| Yes | Yes | No | Yes | No scan req/No Error |
| Yes | Yes | No | No | Error |
| Yes | No | Yes | Yes | Error |
| Yes | No | Yes | No | Error |
| Yes | No | No | Yes | Error |
| Yes | No | No | No | Error |
| No | Yes | Yes | Yes | Conn Req |
| No | Yes | Yes | No | Conn Req |
| No | Yes | No | Yes | No scan req/No Error |
| No | Yes | No | No | Error |
| No | No | Yes | Yes | Error |
| No | No | Yes | No | Error |
| No | No | No | Yes | Error |
| No | No | No | No | Error |
| Yes | Yes | Dis | Yes | Conn Req |
| Yes | Yes | Dis | No | Conn Req |
| Yes | No | Dis | Yes | Error |
| Yes | No | Dis | No | Error |
| No | Yes | Dis | Yes | No scan req/No Error |
| No | Yes | Dis | No | Error |
| No | No | Dis | Yes | Error |
| No | No | Dis | No | Error |
| Yes | Yes | Dis | Dis | Conn Req |
| No | Yes | Dis | Dis | No scan req/No Error |
| Yes | No | Dis | Dis | Error |
| No | No | Dis | Dis | Error |
| Yes | Yes | Yes | Dis | Conn Req |
| Yes | Yes | No | Dis | No scan req/No Error |
| Yes | No | Yes | Dis | Error |
| Yes | No | No | Dis | Error |
| No | Yes | Yes | Dis | Conn Req |
| No | Yes | No | Dis | No scan req/No Error |
| No | No | Yes | Dis | Error |
| No | No | No | Dis | Error |

FIG. 11D

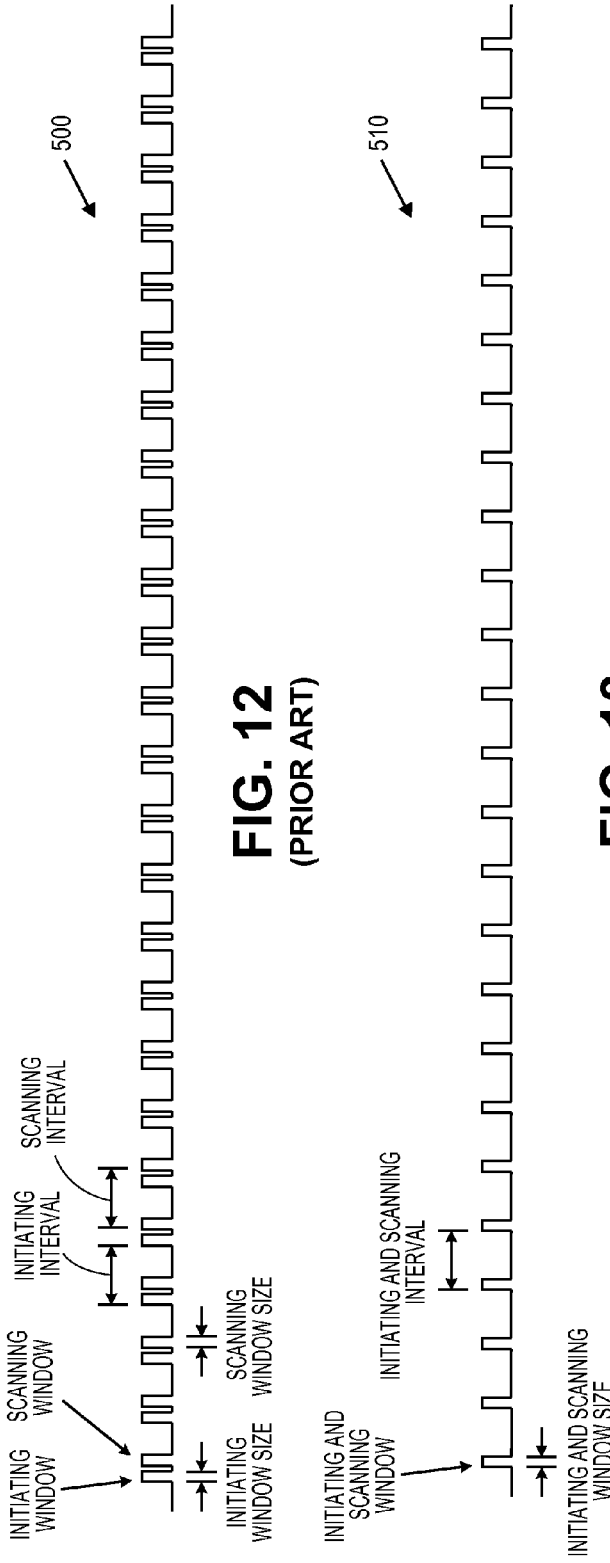
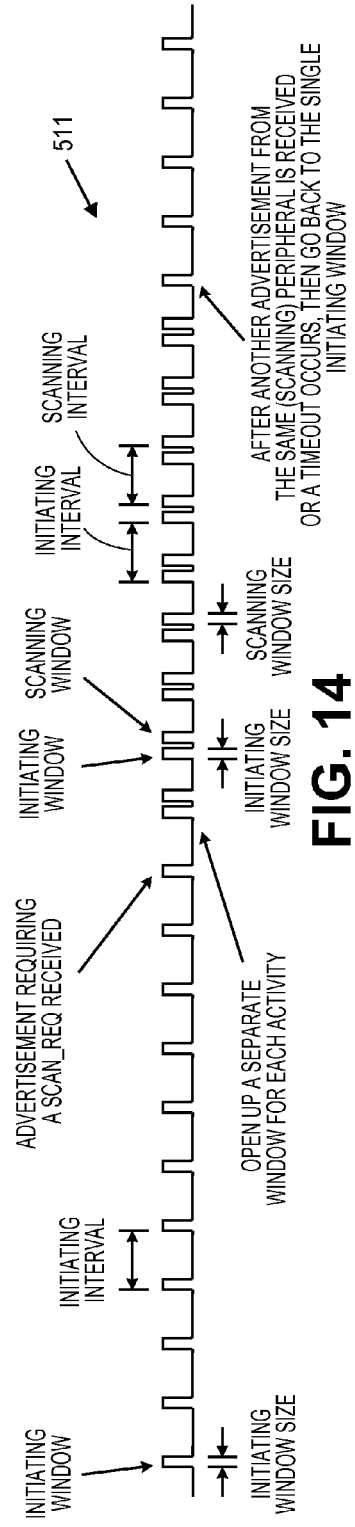
FIG. 12 (PRIOR ART)
FIG. 13
FIG. 14

CONCURRENT BLE SCANNING AND INITIATION FOR BANDWIDTH EFFICIENCY AND POWER SAVING

BACKGROUND OF THE INVENTION

Technical Field of the Invention

The embodiments of the invention relate to wireless communications and, more particularly, to linking of devices that utilize Bluetooth™ technology.

Description of Related Art

Bluetooth™ (hereinafter "BT") wireless technology is a short-range communications system utilized to wirelessly link portable and/or fixed electronic devices, such that cables and wires that would normally connect theses devices are not needed. Presently, there are two forms of BT wireless technology systems. One form of BT is the Basic Rate (BR) system, which is also referred to as classic Bluetooth, since this system has been in existence for some time and currently implemented in wirelessly connecting devices. The second form is a newer implementation of BT, known as Low Energy (LE) BT or Bluetooth Low Energy (BLE). Both systems include device discovery, connection establishment and connection mechanisms.

The Basic Rate system includes optional Enhanced Data Rate (EDR) Alternate Media Access Control (MAC) and Physical (PHY) layer extensions. The Basic Rate system offers synchronous and asynchronous connections with data rates of 721.2 Kbps for Basic Rate, 2.1 Mbps for Enhanced Data Rate and high speed operation up to 24 Mbps with the IEEE 802.11 AMP (Alternate MAC PHY) systems. The BLE system includes features designed to enable products that require lower current consumption, lower complexity and lower cost than classic BT using BR/EDR. The BLE system is intended to consume a fraction of the power required for classic BT and a device powered by a button cell battery may power BLE communications for an extended period from the battery. A number of different applications are envisioned for BLE, including medical monitoring and transmission of the monitored data by a wireless link.

Both classic BT and BLE systems generally operate in the unlicensed 2.4 GHz ISM (Industrial, Scientific, Medical) band, typically utilizing one of the IEEE 802.11 protocols (e.g. 802.11a/b/g/n). Both Bluetooth forms are further described in the Bluetooth Specification, such as Bluetooth Specification Version 4.0, Volumes 0-6, published Jun. 30, 2010, which is incorporated by reference herein.

In the BT 4.0 specification for BLE operation, there are five states that a BLE device may be in, of which one is a standby state. In this specification, the BLE scanning and initiation states are specified as two independent and completely separate activities (states). A BLE device which is compliant to the BT 4.0 specification standard does either scanning or initiation. The scanning state is entered to scan for advertisers on a BLE network, while the initiation state is entered to initiate a connection request. Accordingly, in order to perform both functions of scanning and initiating, a BLE device needs to open a receive window a minimum of two times (one receive window for scanning and one receive window for initiating).

When the receive window is open on a device, the device is in a receiving mode for BLE and the radio frequency (RF) front end of the device, as well as the antenna, may be occupied strictly with the receiving function. This implies that during these two receive periods for scanning and initiating, the device is not available for other activities. Opening two receive windows may consume more power than opening a single receive window. More importantly, when the antenna and/or the RF front end is occupied for such receiving times, the radio portion of the device is not able to do other functions due to the multiplexed timing scheme used in BT. This result may reduce the bandwidth efficiency of the device. The problem may compounded when the device has other wireless communication capabilities that it needs to address, such as classic BT, wireless local area network (WLAN) and/or cellular communication (e.g. long term evolution, commonly known as LTE).

It would be advantageous to combine the operations of scanning and initiating into a single receive window opening for a BLE device. Since there is no prohibition in the BT 4.0 specification to use just one receive window, there is no reason why the BLE device could not send out a connection request (initiation) while the device is scanning for advertisers. If the received advertiser address is one that the device wants to make a connection, the BLE device could always send out a connection request, instead of a scan request. This allows only one receive window to be needed to make a BLE connection, instead of two receive windows, yet remain compliant with the BT 4.0 standard. A number of advantages may be obtained with concurrent scanning and initiation, including saving bandwidth and/or reducing power consumption.

BRIEF DESCRIPTION OF THE DRAWINGS

FIG. 5 is an illustration of a timing diagram depicting a BLE advertiser activity during an advertising event in accordance with one embodiment for practicing the present invention.

FIG. 6 is an illustration of a timing diagram depicting a connection activity during a connection event in accordance with one embodiment for practicing the present invention.

FIG. 11A illustrates functional relationship of using active scan with non-directed advertising packets in accordance with one embodiment for practicing the present invention.

FIG. 11B illustrates functional relationship of using active scan with directed advertising packets in accordance with one embodiment for practicing the present invention.

FIG. 11C illustrates functional relationship of using passive scan with non-directed advertising packets in accordance with one embodiment for practicing the present invention.

FIG. 11D illustrates functional relationship of using passive scan with directed advertising packets in accordance with one embodiment for practicing the present invention.

FIG. 12 shows a prior art timing diagram when separate windows are utilized for scanning and initiating.

FIG. 13 show a timing diagram that combines the scanning and initiating states into a single window in accordance with one embodiment for practicing the present invention.

FIG. 14 shows a timing diagram that is a hybrid of the two techniques shown in FIGS. 12 and 13, in which only one receiving window for the initiating state is used, but in which a second window for scanning is open when a scanning function is needed, in accordance with an alternative embodiment for practicing the present invention.

DETAILED DESCRIPTION OF THE INVENTION

The embodiments of the present invention may be practiced in a variety of wireless communication devices that operate in a wireless Bluetooth (BT) environment or network. The examples described herein pertain to devices that operate within the Bluetooth low energy (BLE) specification (also BT standard and/or protocol) in the 2.4 GHz ISM band and utilizing one of the IEEE 802.11 protocols (e.g. 802.11a/b/g/n). However, the invention may be readily adapted to other standards, protocols, frequency bands, etc., where communications links are established using multiple receiving states where multiple receiving windows may be compressed into a lesser number of receiving windows. Furthermore, the embodiments of the invention described below are either implemented in a LINK layer of a wireless communication device. However, in other embodiments, the application of the invention need not be limited only to the LINK layer.

Figure 1:
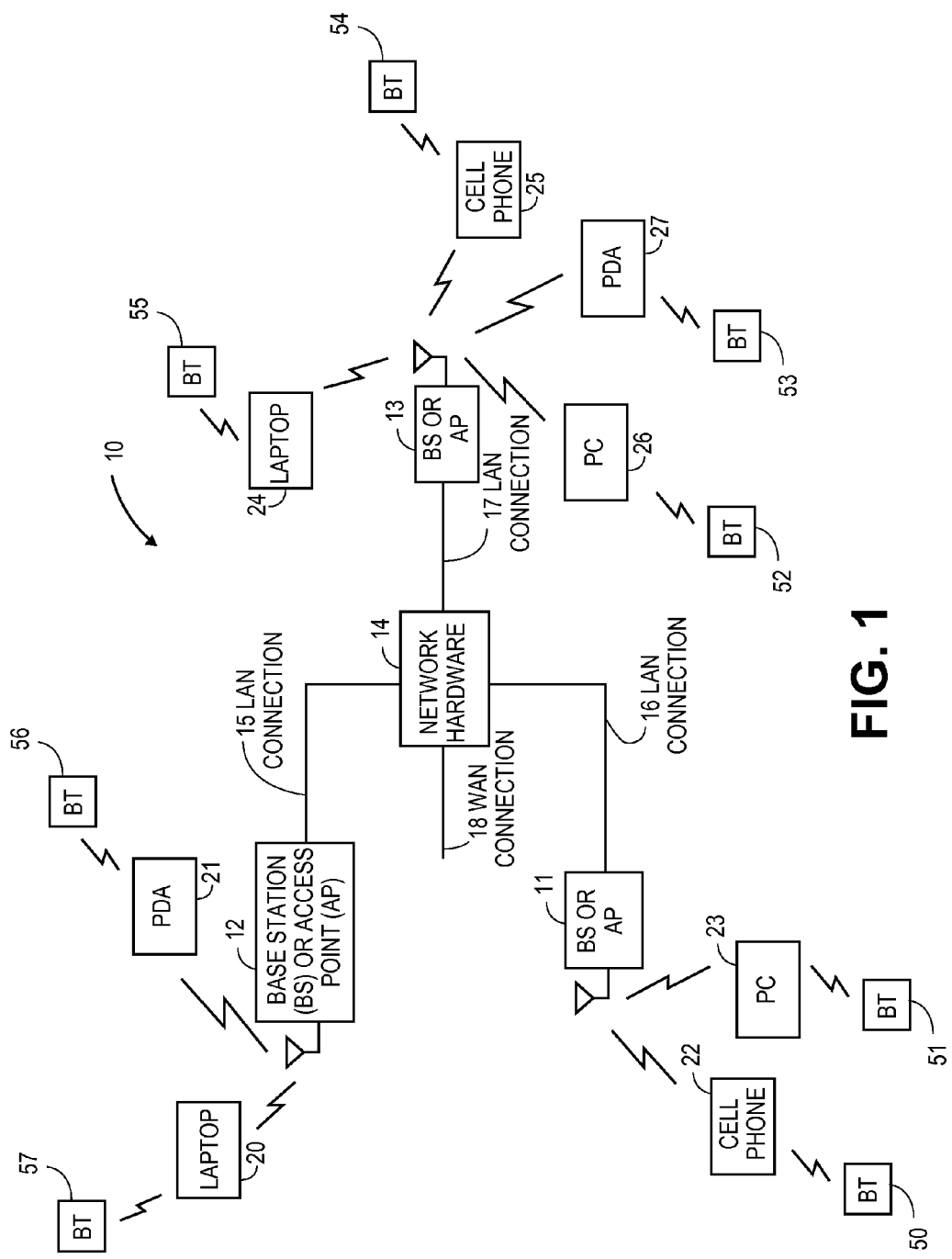
FIG. 1 is a block diagram showing a wireless communication system in accordance with one embodiment for practicing the present invention.

FIG. 1 illustrates one environment for practicing an embodiment of the present invention. FIG. 1 shows a communication system 10 that includes a plurality of base stations (BS) and/or access points (AP) 11-13 (an AP may be a personal control point or PCP), a plurality of wireless communication devices 20-27 and a network hardware component 14. The wireless communication devices 20-27 may be laptop computers 20 and 24, personal digital assistants 21 and 27, personal computers 23 and 26, cellular telephones 22 and 25, and/or any other type of device that supports wireless communications.

The base stations or access points 11-13 may be operably coupled to network hardware 14 via respective local area network (LAN) connections 15-17. Network hardware 14, which may be a router, switch, bridge, modem, system controller, etc., may provide a wide area network (WAN) connection 18 for communication system 10. Individual base station or access point 11-13 generally has an associated antenna or antenna array to communicate with the wireless communication devices in its area. Typically, the wireless communication devices register with a particular base station or access point 11-13 to receive services within communication system 10. For direct connections (i.e., point-to-point communications), wireless communication devices may communicate directly via an allocated channel.

Typically, base stations are used for cellular telephone systems (including 3G and 4G systems) and like-type systems, while access points are used for in-home or in-building wireless networks. Regardless of the particular type of communication system, each wireless communication device includes a built-in radio and/or is coupled to a radio. The radio includes a linear amplifier and/or programmable multi-stage amplifier to enhance performance, reduce costs, reduce size, and/or enhance broadband applications. The radio also includes, or is coupled to, an antenna or antennas having a particular antenna coverage pattern for propagating of outbound RF signals and/or reception of inbound RF signals. In some instances, the antennas may be directional antennas.

One or more of the shown devices may include circuitry and/or software which allows the particular device to communicate using BT communication system technology with each other or with proximal BT devices 50-57. Generally with BT, the range is much shorter than typical WLAN links. The BT communication link may utilize various versions of the BT specification, including the afore-mentioned Bluetooth 4.0 specification. The particular portion of the specification that pertains to the present invention is the Bluetooth low energy (BLE) portion of the specification. Although BLE may operate in conjunction with classical BT, BLE does have a functional difference in the application of the protocol for establishing a communication link between two or more BLE compatible devices.

Figure 2:
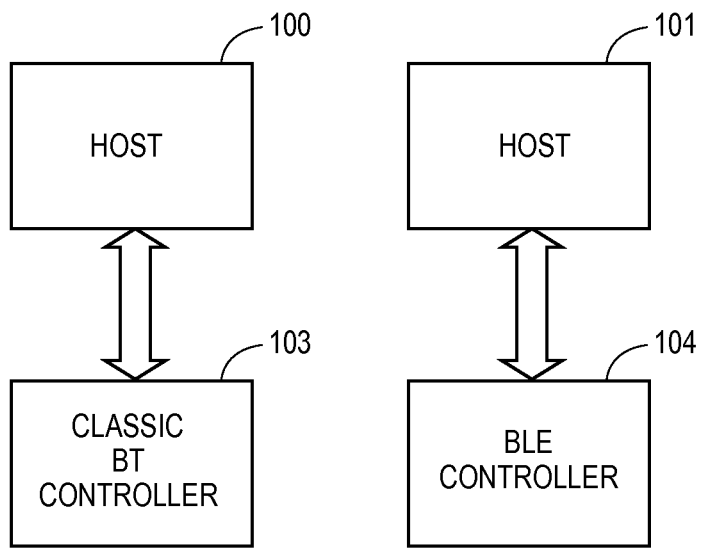
FIG. 2 is a block diagram showing an embodiment of a single mode Bluetooth wireless communication system that employs separate units for classic BT and BLE in accordance with one embodiment for practicing the present invention.

FIG. 2 illustrates a case when classic BT and BLE systems are implemented separately. Thus, host 100 operates with a classic BT controller 103 and host 101 operates with a separate BLE controller 104. The BLE system of host 101 and controller 104 is an example of a single mode BLE system.

Figure 3:
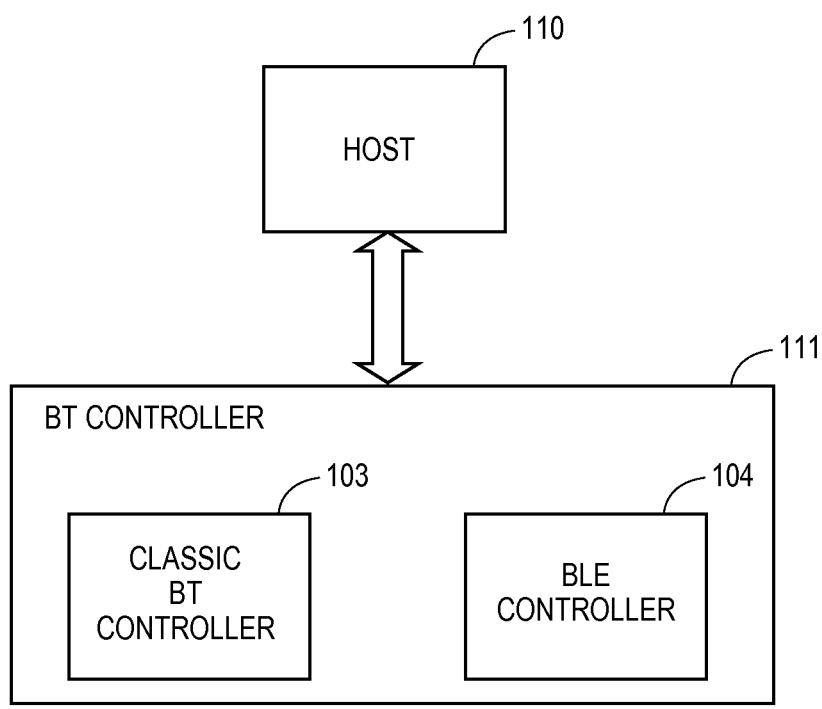
FIG. 3 is a block diagram showing an embodiment of a dual mode Bluetooth wireless communication system that employs one Bluetooth controller for both classic BT and BLE in accordance with one embodiment for practicing the present invention.

FIG. 3 illustrates a dual mode device, in which host 110 operates with a dual mode BT controller 111 that includes both a classic BT controller 103 and BLE controller 104. With a dual mode controller, host 110 may communicate with other respectively compatible devices using either classic BT or BLE.

The classic BT system of controller 103 typically uses a Link Management Protocol (LMP) to communicate with other classic BT compatible devices, in which both Basic Rate (BR) and Enhanced Data Rate (EDR) may be applicable for data transfer. During typical operation of a classic BT device, a physical radio channel is shared by a group of devices that are synchronized to a common clock and frequency hopping pattern. One device provides the synchronization reference and is known as the master and all other devices are synchronized as slaves. A group of devices synchronized in this fashion form a piconet. This is the fundamental form of communication in the classic BT BR/EDR wireless technology.

The physical channel is sub-divided into time units known as slots. Data is transmitted between classic BT devices in packets that are positioned in these slots. Frequency hopping takes place between the transmission and/or reception of packets. Classic BT technology provides the effect of full duplex transmission through the use of a Time-Division Duplex (TDD) scheme. Above the physical channel, there is a layering of links and channels and associated control protocols. The hierarchy of channels and links from the physical channel upwards is typically comprised of physical channel, physical link, logical transport, logical link and L2CAP channel, which hierarchy is illustrated in more detail in FIG. 4.

Within a physical channel, a physical link is formed between a master device and slave device. The physical link provides bidirectional packet transport between the master and slave devices. Since a physical channel could include multiple slave devices, there are restrictions on which devices may form a physical link. There is a physical link between each slave and the master. Physical links are not formed directly between the slaves in a piconet.

The physical link is used as a transport for one or more logical links that support unicast synchronous, asynchronous and isochronous traffic, and broadcast traffic. Traffic on logical links is multiplexed onto the physical link by occupying slots assigned by a scheduling function in the resource manager. The LMP protocol for the baseband and physical layers is carried over logical links in addition to user data. Devices that are active in a piconet have a default asynchronous connection-oriented logical transport that is used to transport the LMP protocol signaling. The Link Manager function uses LMP to control the operation of devices in the piconet and provide services to manage the lower architectural layers.

Above the baseband layer, the L2CAP (Logical Link Control and Adaption Protocol) layer provides a channel-based abstraction to applications and services. It carries out segmentation and reassembly of application data and multiplexing and de-multiplexing of multiple channels over a shared logical link. L2CAP has a protocol control channel that is carried over the default ACL logical transport. Application data submitted to the L2CAP protocol may be carried on any logical link that supports the L2CAP protocol.

Although both classic BT and BLE operate in the 2.4 GHz ISM band and typically utilize one of the IEEE 802.11 communication protocols (e.g. 802.11a/b/g/n), the link protocols are different between the classic BT and BLE. Both classic BT and BLE may utilize aspects of time division multiple access (TDMA) and frequency division multiple access (FDMA). Typically a device has only one radio, so that the radio may only either transmit or receive at any one given time (e.g. TDMA). In any one piconet, a master may only address one slave at a time (e.g. TDMA). Both classic BT and BLE techniques channel hop allowing for multiple radios to be operating simultaneously (e.g. FDMA). For BLE, one version uses three (3) channels as advertising channels and thirty-seven (37) as data channels.

The physical channel is sub-divided into time units known as events. Data is transmitted between BLE devices in packets that are positioned in these events. Two types of events are known as advertising events and connection events. Devices that transmit advertising packets on the advertising PHY channels are referred to as advertisers. Devices that receive advertising on the advertising channels without the intention to connect to the advertising device are referred to as scanners. Devices that seek connections are referred to as initiators. The operation and implementation of BLE in respect to practicing the invention are further described later in the description.

Figure 4:
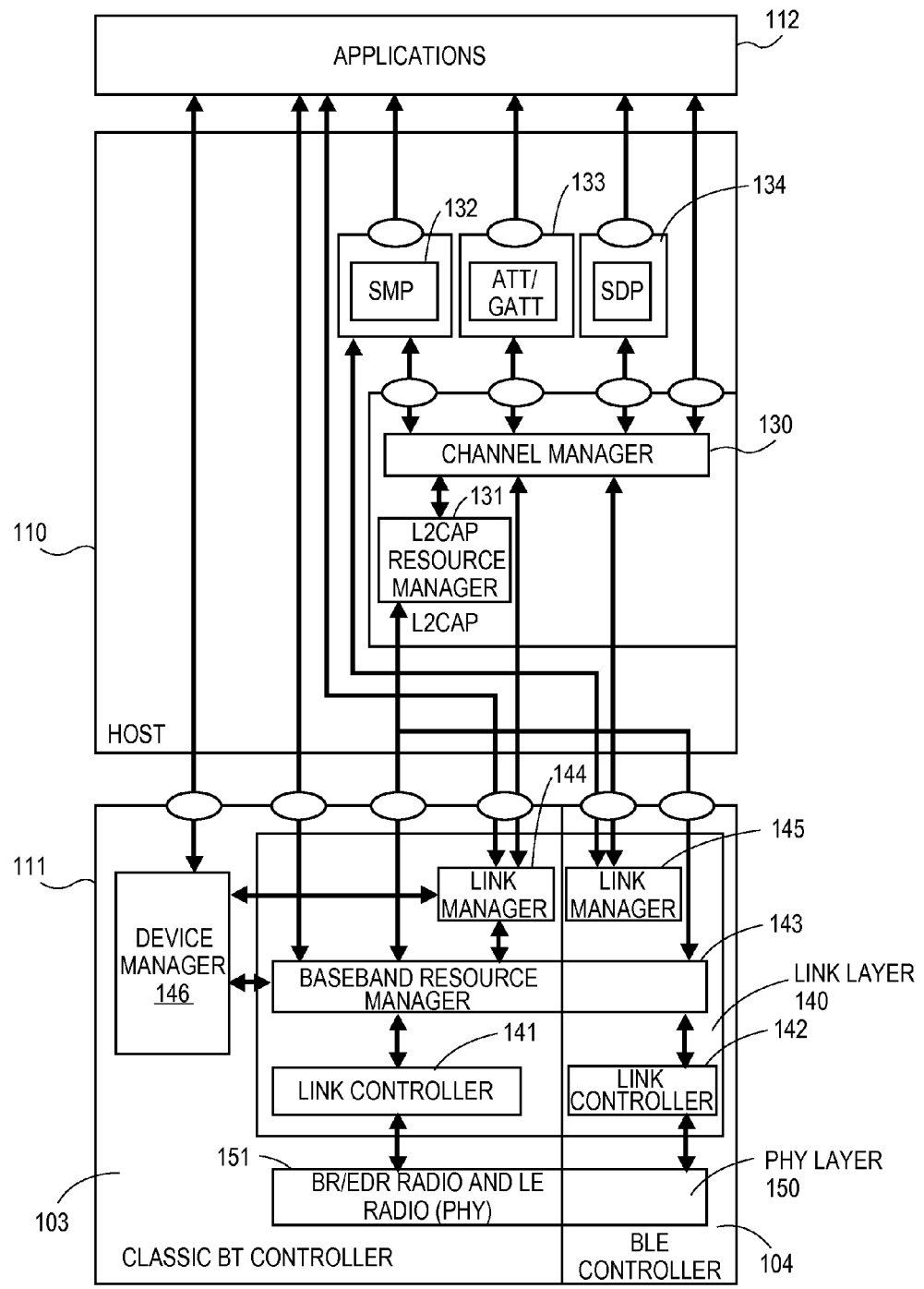
FIG. 4 is a block schematic diagram showing a host and a dual mode Bluetooth controller, in which the Bluetooth controller includes a PHY layer and a LINK layer in accordance with one embodiment for practicing the present invention.

FIG. 4 shows one example embodiment for implementing a BLE device in dual mode operation. However, the BLE portion may be utilized in a single mode BLE device as well. In FIG. 4, a radio portion, shown as radio 151, provides the RF front end for communicating with other BT devices. Radio 151 generally includes one transmitter and receiver for transmitting and receiving, as well as conversion between RF and baseband. Generally, radio 151 forms the physical (PHY) layer 150 of controller 111. It is to be noted that other embodiments may have multiple radio stages (e.g. multiple transmitters and or multiple receivers).

A link controller 141 for classic BT and link controller 142 for BLE are used to link radio 151 to a baseband processing device, shown as baseband resource manager 143. A link manager 144 for classic BT using Link Management Protocol (LMP) and link manager 145 using the LINK layer Protocol (LL) for BLE for communicating with remote BT devices are used to link baseband resource manager 143 to host 110, via channel manager 130. A L2CAP manager 131 for the L2CAP layer may be utilized with classic BT connection. The link controllers 141, 142, baseband resource manager 143 and link managers 144, 145 generally form the LINK layer 140 of controller 111.

Host 110 may include other functional units, other than channel manager 130 for providing various functions for the L2CAP layer and above. Some of these functions are shown as Security Manger Protocol (SMP) unit 132, Attribute/Generic Attribute Protocol (ATT/GATT) unit 133 and Service Discovery Protocol (SDP) unit 134. Other functional elements may be present in host 110 other than those units shown in FIG. 4. Furthermore, detailed workings of classic BT and BLE pertaining to the various functional units shown in FIG. 4 may be obtained from the afore-mentioned Bluetooth 4.0 specification.

The host 110 in FIG. 4 is shown coupled to an applications stack or unit 112, that provides one or more desired applications for operating the host 110 to provide classic BT and/or BLE communications with one or more remote devices. In some instances, the applications may be resident within host 110 itself. In other embodiments, the functions of the host and applications may be present in the controller 111.

As noted above in reference to BLE operation, BLE uses two types of events, which are known as advertising events and connection events. Devices that transmit advertising packets on the advertising PHY channels are referred to as advertisers. Devices that receive advertising on the advertising channels without the intention to connect to the advertising device are referred to as scanners. Devices that seek connections are referred to as initiators. Transmissions on the advertising PHY channels occur in advertising events.

As shown in diagram 200 of FIG. 5, at the start of each advertising event 201, the advertiser sends an advertising packet corresponding to the advertising event type. If the scanner sends out a scan request to the advertiser on the same advertising PHY channel, the advertiser may respond with a scan response. The advertising PHY channel may change on the next advertising packet sent by the advertiser in the same advertising event. The advertiser may end the advertising event at any time during the event. The subsequent advertising event 202 is also shown in diagram 200. BLE devices may fulfill the entire communication in the case of unidirectional or broadcast communication between two or more devices using advertising events. They may also use advertising events to establish pair-wise bi-directional communication between two or more devices using data channels.

As shown in diagram 210 of FIG. 6, a device that desires to form a connection to another device listens for connectable advertising packets. Such devices are referred to as initiators. If the advertiser is using a connectable advertising event, an initiator may make a connection request using the same advertising PHY channel on which it received the connectable advertising packet, as shown during advertising event 211. The advertising event is ended and connection events begin if the advertiser receives and accepts the request for a connection to be initiated. Once a connection is established, the initiator becomes the master device in a piconet and the advertising device becomes the slave device. Connection events, shown as connection events 212 and 213, are used to send data packets between the master (M) and slave (S) devices. In connection events, channel hopping occurs at the start of each connection event. Within a connection event, the master and slave alternate sending data packets using the same data PHY channel. The master initiates the beginning of each connection event and may end each connection event at any time.

Figure 7:
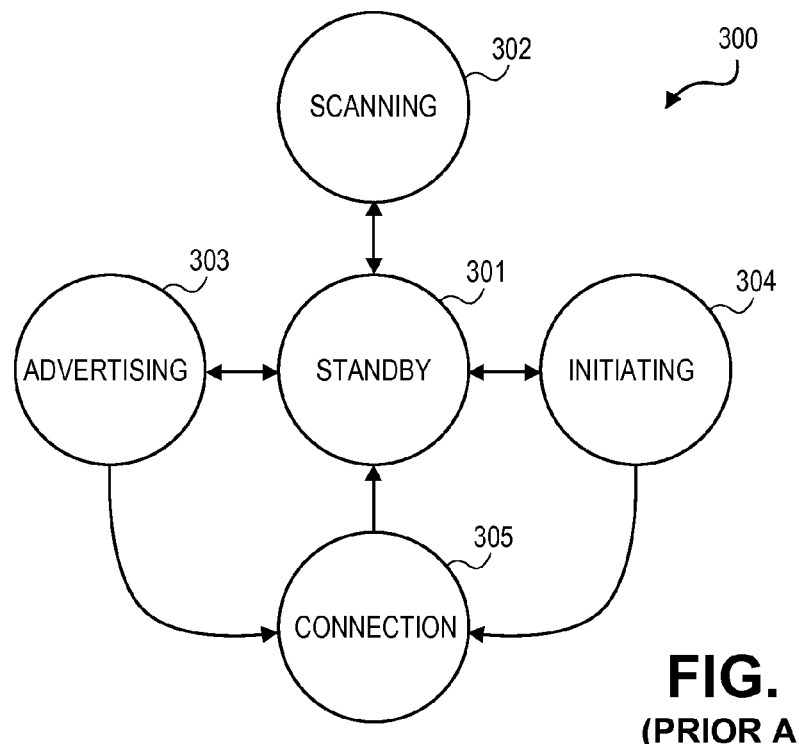
FIG. 7 is a prior art state diagram showing the five states specified for BLE operations under the Bluetooth 4.0 specification.

FIG. 7 shows a diagram of a state machine 300 that illustrates the five (5) states of the LINK layer for BLE devices, as currently specified by the BT 4.0 specification. The five states are standby 301, advertising 303, scanning 302, initiating 304 and connection 305 states. LINK layer state machine 300 allows only one state to be active at a time. The LINK layer may have multiple instances of the LINK layer state machine 300.

The LINK layer in the standby state does not transmit or receive any packets. Standby state 301 may be entered from any other state. In advertising state 303, the LINK layer transmits advertising channel packets and possibly listens to and responds to responses triggered by these advertising channel packets. A device in advertising state 303 is known as an advertiser. Advertising state 303 may be entered from standby state 301. The LINK layer in scanning state 302 listens for advertising channel packets from devices that are advertising. A device in scanning state 302 is referred to as a scanner. Scanning state 302 may be entered from standby state 301.

The LINK layer in initiating state 304 is listening for advertising channel packets from a specific device(s) and responds to these packets to initiate a connection with another device. A device in initiating state 304 is known as an initiator. Initiating state 304 may be entered from standby state 301. Connection state 305 may be entered either from initiating state 304 or advertising state 303. A device in connection state 305 is known as being in a connection. When in connection state 305, a device may be a master or a slave. When the device enters connection state 305 from initiating state 304, the device in connection state 305 is the master. When entered from advertising state 303, the device in connection state 305 is a slave.

The LINK layer may optionally support multiple state machines. If it does support multiple state machines, the following restrictions apply. The LINK layer in connection state 305 may not operate as master and slave at the same time. When in connection state 305 as a slave, only one connection is permitted. When in connection state 305 as a master, multiple connections are permitted. The LINK layer may not operate in initiating state 304, if the LINK layer is already operating in connection state 305 as a slave.

Because BT 4.0 specification requires BLE scanning and initiating states to be two independent and completely separate activities, a BLE device which is compliant to the BT 4.0 specification does either scanning or initiation. With prior art practice, this separation of scanning and initiating states requires the device, which is the master, to open the receive window twice to monitor the traffic. In order to make a connection (enter connection state 305), the device needs to open a receive window in scanning state 302 to scan for advertisers and open the receive window again in initiating state 304 to initiate (send) a connection request. This implies that during these two periods, the radio and antenna are committed to a BLE receiving mode and may not be available for other activities, which may include classic BT, WLAN and/or cellular communication (e.g. 3G, LTE, 4G). FIG. 12 shows a timing diagram 500 that illustrates the presence of having two separate receive windows, one receive window for scanning and a separate receive window for initiating. The initiating window may precede or follow the scanning window.

Figure 8:
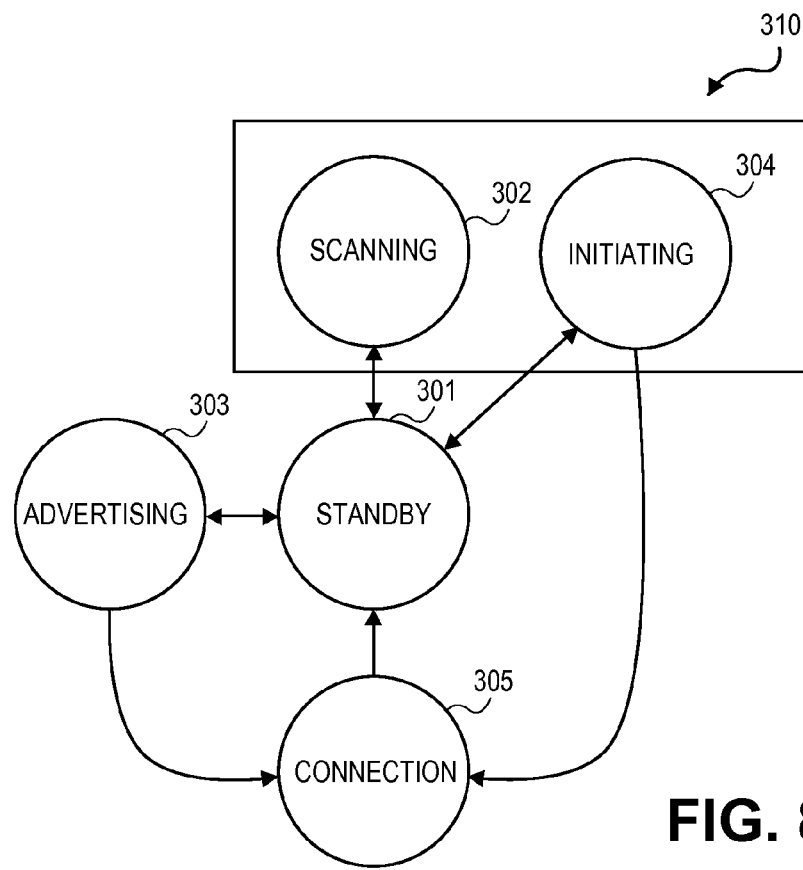
FIG. 8 is a state diagram showing the combining of the scanning and initiating states to allow one receive window for BLE operations in accordance with one embodiment for practicing the present invention.

Referring to FIG. 8, a state machine 310 to practice one embodiment of the invention is shown. State machine 310 has the same five states noted in FIG. 7, as required by the BT 4.0 specification. However, in this instance, scanning and initiating operations are combined into a single receive window (as illustrated by the enclosure of the two states 302 and 304). It is to be noted that there exists no physical constraint why the master could not also send out a connection request while it is scanning for advertisers, if the received advertiser address is one of the devices that the master device wants to make connection to. Combining the two activities of scanning and initiating would require only one receive window, instead of two. Having one receive window does not violate the BT 4.0 specification for BLE operation, since both scanning and initiating functions are still being performed by the BLE device. Utilizing one receive window may result in lower power consumption, which is advantageous for BLE devices operating on battery power. Furthermore, having one less receiving window also allows the device to perform other functions during the period of the now absent second window, thereby possibly improving bandwidth efficiency. FIG. 13 shows a timing diagram 510 in which the scanning and initiating states are combined into a single receive window. Comparing the one window timing diagram 510 to the two window timing diagram 500 of FIG. 12 illustrates the significant advantage obtained by having one receive window opening to provide concurrent scanning and initiating operations.

The BLE portion of the BT 4.0 specification uses a "white list" (WL) to setup scanning and connection filtering policies. When the policy is enabled (e.g. the white list is in use), if the device address received in an advertisement packet is in the white list, then appropriate action is taken for scanning or initiating a connection. If the received device address does not match with a content of the white list, or does not match a preprogrammed peer address, no further action is taken for the device with that address. The white list filtering is configured by the host and used by the LINK layer to filter advertisers, scanners or initiators. The white list allows the host to configure the LINK layer to act on a request without awakening the host. The embodiments of the invention that combine the scanning and initiating states into one receiving window operation also uses a white list in accordance with the BT 4.0 specification, but modified to accommodate two white lists, one for scanning and one for initiating.

Figure 9A:
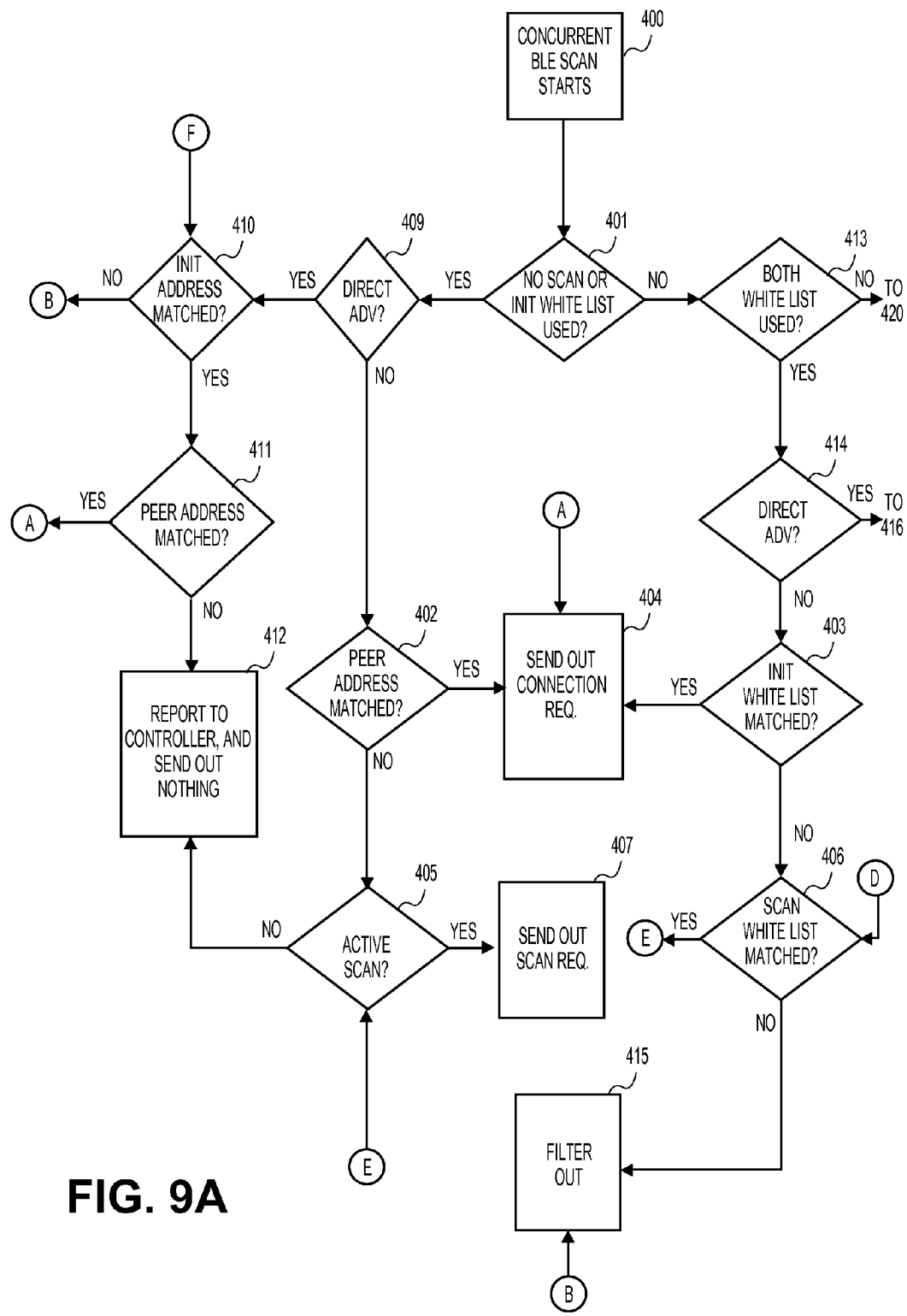
FIGS. 9A and 9B show a flow chart of processing steps associated with the initiating and scanning activities using one receive window in accordance with one embodiment for practicing the present invention.
Figure 9B:
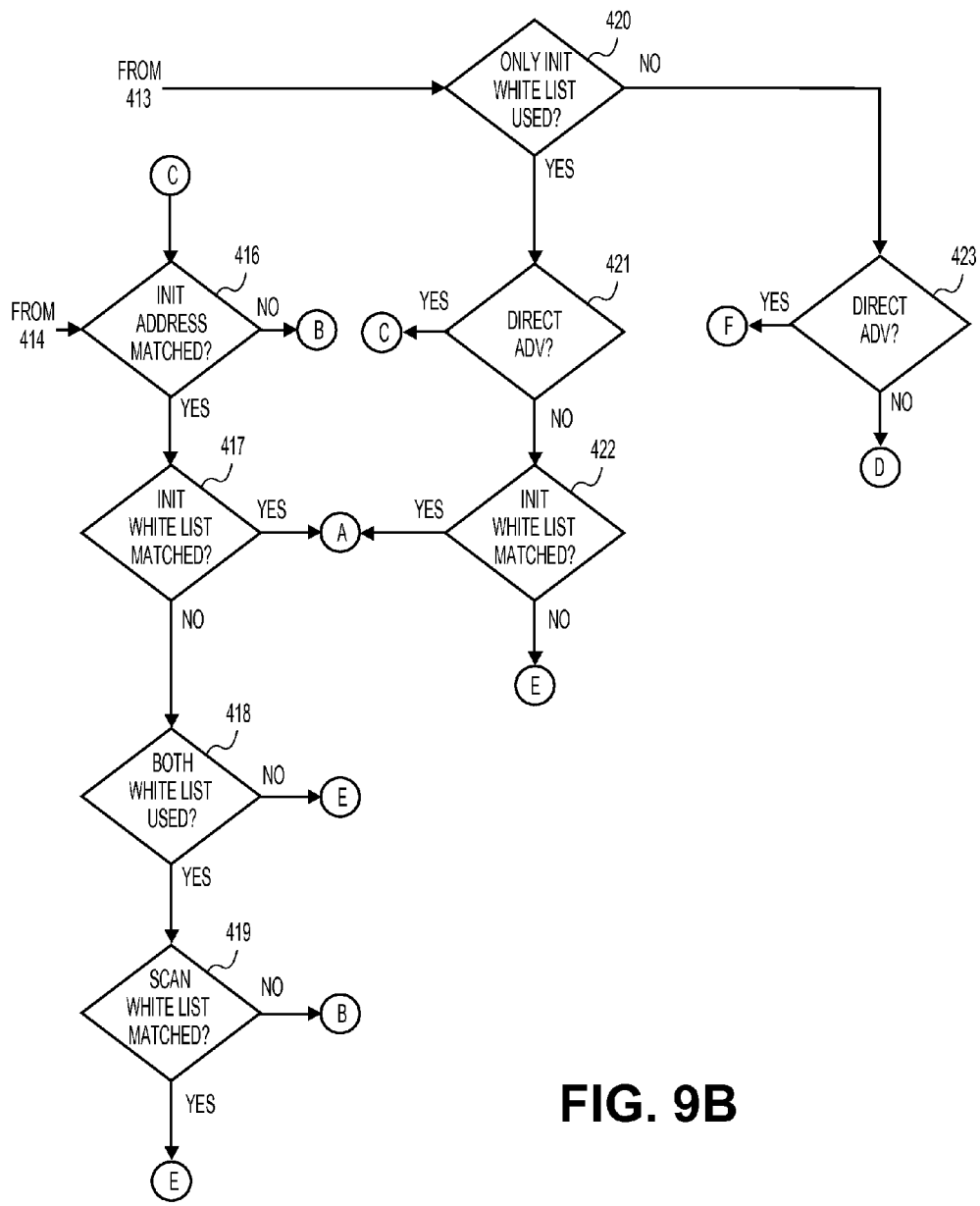

FIG. 9 (shown on two sheets as 9A and 9B) depicts a flow chart that shows an example method in implementing the concurrent scanning and initiating operation according to one embodiment for practicing the invention. The concurrent scanning and initiating operation shown utilizes both a scanning white list and an initiating white list. Furthermore, scenarios that may result from the concurrent scanning and initiating operation of FIG. 9 is further categorized in the tables of FIGS. 11A-D. The method shown in FIG. 9 takes into account the use of active scan or passive scan for both non-directed and directed advertisement packets, as well as the use of one, both or no white list(s). Directed advertisement pertains to a condition when the advertisement packet is directed to a particular address (e.g. the packet address matches the receiver's device address), whereas non-directed advertisement pertains to a condition when the advertisement packet is broadcast without a directed address. Peer address pertains to a preprogrammed peer address of other devices stored in the receiving device. Active scan pertains to a scanning situation when a response may be forthcoming, whereas passive scan pertains to a scanning situation where the advertisement packet is scanned, but no response is to be initiated by the receiving device.

Thus, as illustrated in FIG. 9, when the receiving window is opened, the concurrent BLE scanning and initiating operation starts (block 400), allowing the advertising packet(s) sent from the advertiser to be received by the BLE device. The operation then depends on if one or both of the white lists is/are used to filter the advertisement packet. If neither white list is used (block 401), the operation determines if the advertisement packet is a directed advertisement packet (block 409). If directed, the address in the packet is checked for the initiating address that corresponds to the device (block 410) and if there is a match, the method progresses to check for a peer address match (block 411). If there is a peer address match (block 411), a connection request is sent out (block 404).

If at block 410, the initiating address check does not match the device address, the packet is filtered out (block 415) at the LINK layer, typically without notifying the high-level controller and/or the host. At the peer address check at block 411, if the packet does not match one of the peer addresses stored in the device, the packet reception is reported to the higher-level controller, but no response is sent out (block 412) from the receiving device.

Alternatively, at block 409, if the packet is a non-directed advertisement packet, the peer address is checked (block 402) and if a match occurs, a connection request is sent out (block 404). If there is no peer address match at block 402, a scan request is sent out (block 407) from the device if active scan is employed. If passive scan is employed for the device (block 405), then nothing is sent out for the scanning operation (block 408), but the packet reception is reported to the controller (block 412).

If at block 401, at least one white list is used, the method then determines if both the scanning white list and the initiating white list are used. If both white lists are used, the method then checks to determine if the advertisement packet is a directed advertisement packet (block 414). If the packet is a non-directed advertisement packet (block 414), then the initiating white list is checked (block 403). If the packet contains an initiating address that matches an address entry in the initiating white list (block 403), a connection request is sent out (block 404). If block 403 does not result in a match, the scanning white list is checked next. If the address in the packet matches an address entry in the scanning white list (block 406), the method progresses to determine if the scan operation is active or passive (block 405) and responds accordingly as shown at block 407 or 412 and described above.

If at block 414, the packet is a directed advertisement packet, the address in the directed packet is checked (block 416) and, if it matches the device address, the initiating white list is checked for a matching address (block 417). If at block 416, the address does not match the device address, then the packet is filtered out (block 415). If the initiating address of the directed advertisement packet matches an entry of the initiating white list (block 417), a connection request is sent out (block 404). If there is no match in the initiating white list at block 417, the method proceeds to check if both white lists are used (block 418). Note that this check is made at block 418, since there is an alternate entry into block 416 through path "C."

If both white lists are being used (block 418), the method has already checked for the initiating address match and found none, so the check is now made with the scanning white list (block 419). If the packet address matches an entry in the scanning white list, then the method progresses to block 405 where appropriate response (to block 407 or 412) is made at block 405, depending on which of the scan (active or passive) is being used. If there is no match in the scanning white list at block 419, the packet is filtered out (block 415).

Note that at block 418, if both white lists are not being utilized, then only the initiating white list is being used. If only the initiating white list is being used at block 418, the method progresses to block 405 and the resulting path is to block 407 or block 412, depending on the type of scan (active or passive) being employed.

Returning to block 413, if only one white list is being utilized, the method progresses to check which white list is being used (block 420). If only the initiating white list is being used, then the method checks to determine if the advertisement packet is a directed advertisement packet (block 421). If direct, the method progresses to check for the initiating address match at block 416 and further transcends through the paths from block 416 as described above. If the packet is a non-directed packet (block 421), the initiating white list is checked for a match (block 422). If the address contained in the packet matches an entry in the initiating white list, then a connection request is sent out (block 404). If there is no match, then the method progresses to block 405 and proceeds on the path from block 405, depending on whether active or passive scan is being used.

Returning to block 420, if only the scanning white list is being utilized, then a check is made to determine if the advertisement packet is a directed or non-directed packet (block 423). If the advertisement packet is a directed packet, the method progresses to block 410 and follows the decision branches from block 410 as described above. If the advertisement packet is a non-directed packet, then the method progresses to block 406 to make a scanning white list check and proceed from block 406 as previously described based on the whether there is a scanning white list match or not.

It is apparent from the flow diagram of FIG. 9, that when the receiving window opens, the process initially determines which white list(s) is/are being used (or not at all), followed by a determination of directed or non-directed advertisement packet. The method then checks the packet for attributes pertaining to the initiating operation first, followed by attributes pertaining to the scanning operation. The final portion of the method determines a response based on whether active scanning or passive scanning is being utilized.

Furthermore, it is to be noted that the particular process as illustrated in the flow diagram may be implemented in a variety of ways, including hardware, software, firmware or combinations thereof. In one embodiment the method of the flow diagram is implemented as an algorithm contained in a software routine. In another embodiment, the method of the flow diagram is implemented in hardware. It is to be noted that the flow diagram of FIG. 9 is just one example for implementing the invention and that other methods may be implemented as different embodiments for practicing the invention. For example, instead of performing the checks of initiating first followed by checks for scanning for a received packet, the two processes may be reversed. That is, in other embodiments, scanning checks are made first followed by initiating checks for a received advertisement packet.

Figure 10:
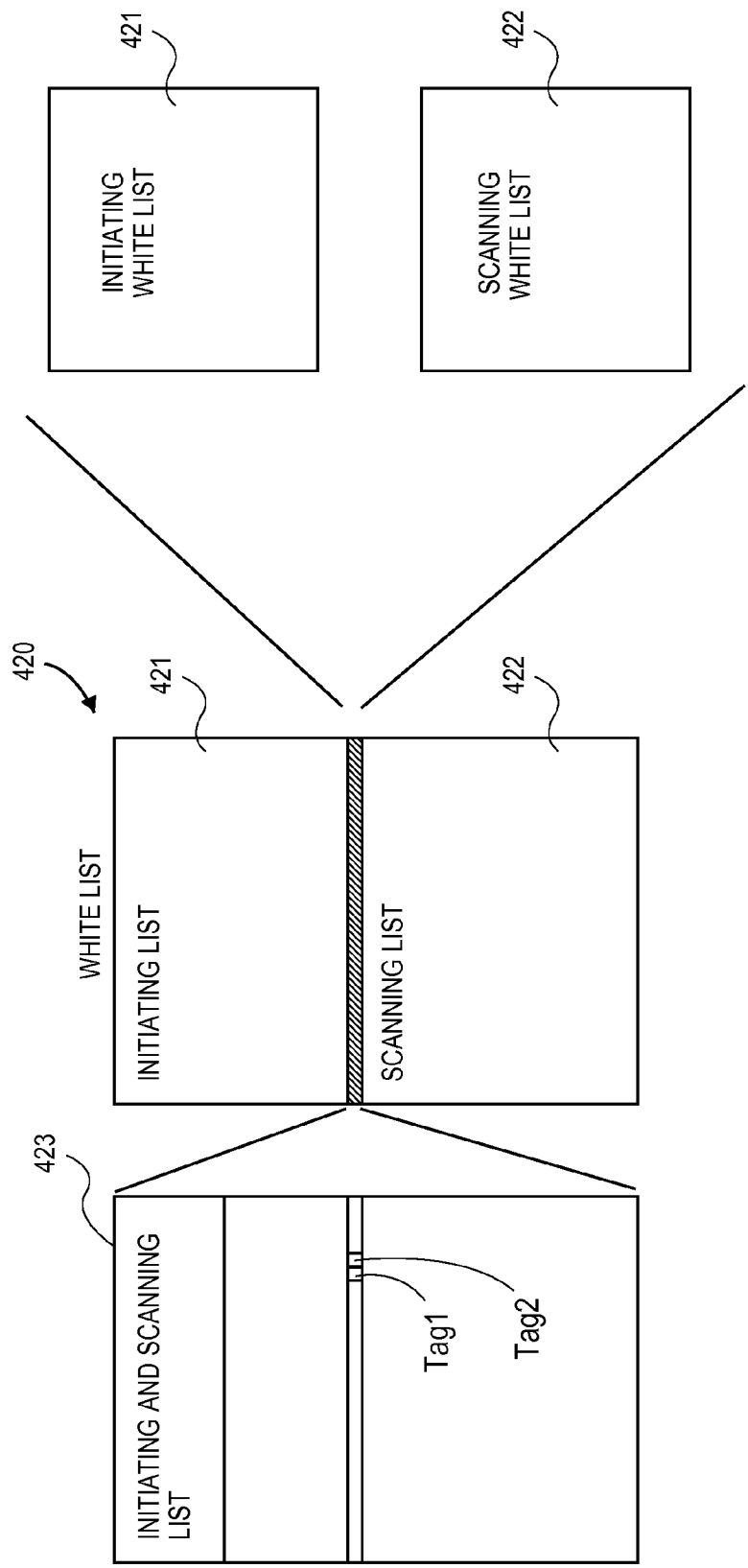
FIG. 10 is a diagram showing the combining of initiating white list and scanning white list in accordance with one embodiment for practicing the present invention.

In the flow diagram of FIG. 9, the two white lists are noted as separate white lists. Because of the concurrent operation of performing both scanning and initiating within the one open receive window, a demarcation is needed for accessing entries in the two white lists. The entries for the two white lists may be separated into two separate white lists or they may be combined together, but tagged for entry in each of the white lists. Accordingly, as shown in FIG. 10, in one instance two separate white lists are maintained as separate white lists 421, 422. The two separate white lists may be mapped to separate storage (e.g. memory) modules or units (as shown to the right in FIG. 10) or mapped to different locations in one storage module or unit 420. Alternatively, a single white list 423 may be used, wherein tags are used to identify which white list or lists a particular entry belongs. For example, in one embodiment, Tag1 and Tag2 are used, where each Tag# is represented by a bit. Thus, setting the Tag1 bit designates that a particular entry belongs in the initiating white list and setting Tag2 bit designates that a particular entry belongs in the scanning white list. Setting both tags designates that a particular entry belongs in both white lists. In one embodiment, in addition to 48 bit of address and one bit of public/random address indicator, two bits are added to the entry as Tag1 and Tag2 attributes. In other embodiments, firmware may be used to dynamically configure the attribute.

It is to be appreciated that other techniques may be readily used to set entries for one or both white lists.

FIGS. 11A-D show tables for implementing the concurrent scanning and initiating activities as described above in reference to the method of FIG. 9. The tables identify the various situations encountered in the decision process for the flow diagram of FIG. 9 and the results obtained. The tables show conditions of using active scan or passive scan for both non-directed and directed advertisement packets. The headings for each table identify conditions when the advertisement packet matches a preprogrammed peer address (first column), when the packet address of a directed advertisement matches the receiver's device address (second column), when the advertising packet address matches an entry in the initiating white list WL (third column), when the advertising packet matches the scanning WL (fourth column) and the expected result from the device (fifth column). A disable (Dis) status is used for a particular WL when that WL is not used (e.g. disabled). Note also that the initiating match only applies to directed advertisement packets. An error condition in the Expected Result heading correlates to the filter out result of block 415 in FIG. 9.

Some examples of the concurrent scanning and initiation as implemented in the tables of FIG. 11 are described below and better understood when applied to the method illustrated in the flow diagram of FIG. 9:

With Active Scan Enabled:

1. If both scanning and initiation white list policy are disabled (Dis):

In this case if the received advertiser address matches with a preprogrammed peer address, a connection request is sent out if a connectable advertisement packet is received. If a directed advertisement packet is received, in addition to the peer address match, the received initiation ("init") address also has to match with the receiver's device address in order for the receiver to send out a connection request. Otherwise, a scan request is sent out and the advertisement packet is a connectable (non-directed) advertisement packet.

2. If the initiation white list is enabled and the scanning white list is not enabled:

In this case if the received connectable (non-directed) advertiser address is in the white list, then a connection request is sent out.

If the received directed advertiser address is in the initiation white list and received initiation address also matches, a connection request is sent out.

If the received connectable (non-directed) advertiser address is not in the initiation white list, a scan request is sent out.

If the received directed advertiser address is not in the initiation white list, but the received initiation address matches, the scanner reports the received message to the controller and sends nothing out.

If the initiation address in the received direct advertisement packet does not match with the scanner's own address, regardless whether a preprogrammed peer address matches or not, or whether the received advertiser address is in the white list or not, the device reports a receive error and sends nothing out.

3. Initiation white list is not enabled, scanning white list is enabled:

If the received connectable (non-directed) advertiser address matches with a preprogrammed peer address, a connection request is sent out.

If the received connectable (non-directed) advertiser address does not match with a preprogrammed peer address, but is in the scan white list, a scan request is sent out.

If the received connectable (non-directed) advertiser address does not match with a peer address, and is not in the white list, the device sends nothing out.

If the received directed advertiser initiation address matches with scanner's own address and the advertiser address also matches a preprogrammed peer address, a connection request is sent out.

If the received directed advertiser initiation address matches with scanner's own address and the advertiser address does not match a preprogrammed peer address, the scanner reports the received packet to the controller and sends nothing out.

If the received directed advertiser initiation address does not match with the scanner's own address, the scanner will report an error to the controller and sends nothing out.

4. Both initiation and scanning white list enabled:

If the received connectable (non-directed) advertiser address is in the initiation white list, a connection request is sent out. If the received advertiser address is not in the initiation white list but is in the scanner white list, then a scan request is sent out. If neither is true, the advertisement packet is ignored.

For directed advertisement, if the received initiation address matches the scanner device's own address and received advertiser address is in the initiation white list, a connection request is sent out.

For directed advertisement, if the received initiation address matches the scanner device's own address but the received advertiser address is not in the initiation white list, the scanner passes the received packet to the controller and sends nothing out.

For directed advertisement, if the received initiation address does not match to the scanner's own address, the scanner reports an error to the controller and sends nothing out.

In all other cases, nothing is sent out.

With Passive Scan Enabled:

5. Both scanning and initiation white list policy are disabled:

In this case, if the received connectable (non-directed) advertiser address matches with a preprogrammed peer address, a connection request is sent out. For directed advertisement, additionally the received initiation address has to match the scanner's address to send out a connection request. Otherwise, the device sends out nothing.

6. Initiation white list is enabled, scan white list is not enabled:

If the received connectable (non-directed) advertiser address is in the initiation white list a connection request is sent out.

If the received directed advertiser address is in the initiation white list and at the same time the received initiation address matches the scanner's own address, a connection request is sent out.

If the received connectable (non-directed) address is not in the initiation white list, the scanner will report the advertisement packet to the host but nothing is sent out to the advertiser.

If the received initiation address of the direct advertiser address does not match the scanner's own address, regardless if the received advertiser address is in the white list or not, the device reports a receive error and sends nothing out.

If the initiation address in the received directed advertisement packet matches with the scanner's own address, but the received advertiser address is not in the initiation white list, the scanner passes the received packet to the host but sends nothing out to the advertiser.

7. Initiation white list is not enabled, scanning white list is enabled:

If the received connectable (non-directed) advertiser address matches with a preprogrammed peer address, a connection request is sent out.

If the received connectable (non-directed) advertiser address does not match with a preprogrammed peer address, but is in the scan white list, the scanner passes the received packet to the host and sends nothing out to the advertiser.

If the received connectable (non-directed) advertiser address does not match with a preprogrammed peer address, and is not in the scan white list, the device ignores the advertisement packet and sends nothing out.

If the received directed advertiser initiation address matches with the scanner's address and the advertiser address also matches a preprogrammed peer address, a connection request is sent out.

If the received directed advertiser initiation address matches with the scanner's address and the advertiser address does not match a preprogrammed peer address, the scanner reports the received packet to the host but sends nothing out to the advertiser.

If the received directed advertiser initiation address doesn't match with the scanner's address, the scanner will ignore this packet and sends nothing out to the advertiser.

8. Both initiation and scanning white list enabled:

If the received connectable (non-directed) advertiser address is in the initiation white list, a connection request is sent out. If the received advertiser address is not in the initiation white list but is in the scanner white list, the scanner passes the received packet to the host but sends nothing out to the advertiser. If the received advertiser address is in neither white lists, the scanner ignores this advertisement packet and nothing is sent to the advertiser.

For directed advertisement, if the received initiation address matches the scanner's own address and the received advertiser address is in the initiation white list, a connection request is sent out.

For directed advertisement, if the received initiation address matches the scanner's own address but the received advertiser address is not in the initiation white list, the scanner passes the received packet to the host but sends nothing out to the advertiser.

For directed advertisement, if the received initiation address does not match with the scanner's own address, the scanner ignores this advertisement packet and sends nothing out to the advertiser.

As noted above, FIG. 12 shows the prior art technique of opening two separate receiving windows for a BLE device for each of the scanning and initiating operations to make a connection to an advertiser. Also as described above, FIG. 13 shows the concurrent scanning and initiating operation of the present invention, in which one receive window is opened to perform both scanning and initiating operations.

FIG. 14 shows a timing diagram 511 which is a hybrid technique that is an alternative embodiment for practicing the invention. In the hybrid technique, a single initiating window is utilized to monitor the advertisement packets. When an advertisement requiring a scan request is noticed while performing the initiating operation, the device opens a separate window to perform the scanning operation. The device then applies the prior art technique of using separate receive windows for initiating and scanning. After another advertisement from the same advertiser is received or a timeout period lapses, the device resorts to the single receive window mode. With this hybrid technique, some amount of power conservation and bandwidth efficiency are observed, but not to the extent of the single receive window mode shown in FIG. 13.

One advantage of the hybrid technique is that it may be readily adapted for use within devices that have hardware geared to the two window technique (e.g. of FIG. 12). By making firmware adjustments, the hybrid technique may be implemented in existing integrated circuit chips with slight modifications. In one embodiment, the concurrent scanning and initiating technique utilizing only one receive window (e.g. of FIG. 13) is designed into a new integrated circuit chip that employs dedicated hardware, although in other embodiments, the one receive window technique may be implemented in hardware, software, firmware, or a combination thereof.

Figure 15:
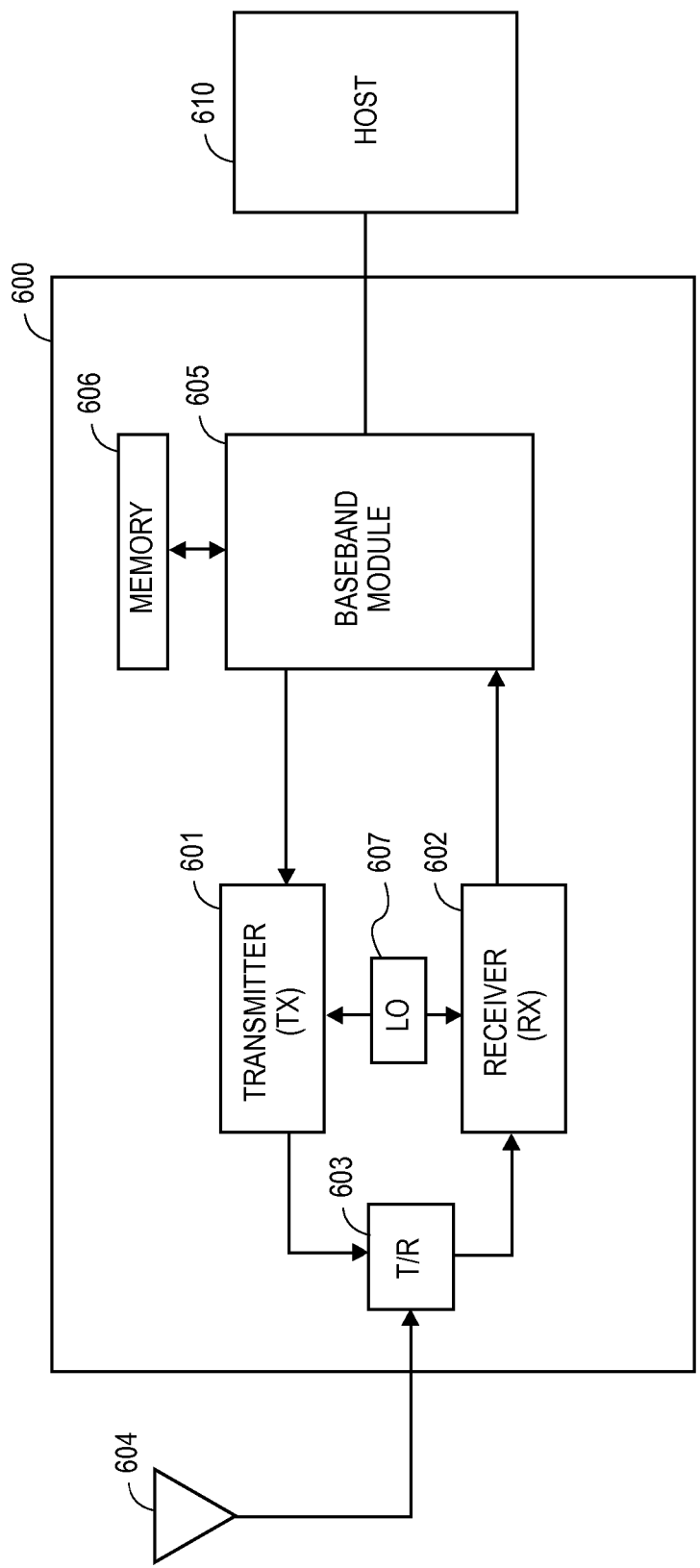
FIG. 15 is a circuit block diagram showing one hardware implementation to provide the PHY and LINK layers that operate with a host in accordance with one embodiment for practicing the invention.

FIG. 15 is a schematic block diagram illustrating part of a wireless communication portion 600 of a wireless device that includes a transmitter (TX) 601, receiver (RX) 602, local oscillator (LO) 607 and baseband module 605. Baseband module 605 provides baseband processing operations. In some embodiments, baseband module 605 is or includes a digital-signal-processor (DSP). Baseband module 605 is typically coupled to a host unit (such as the afore-mentioned host unit for BT operations), applications processor or other unit(s) that provides BT operational processing for the device and/or interface with a user. In one embodiment, the hardware diagram of FIG. 15 is representative of a device that provides BT functionality and specifically BLE compatible functionality described above.

In FIG. 15, a host unit 610 is shown. For example, host 610 may represent host 101, 110 of a BLE device, while device portion 600 is utilized to provide the radio (e.g. RF front end) and baseband functions. The radio portion may be strictly for single mode BLE, dual mode BT/BLE, or it may include other wireless operations such as WLAN (e.g. WiFi) and/or cellular or satellite communications. With BT operations, device portion provides the PHY layer and LINK layer functionality of BT/BLE controller, such as controller 111 shown in FIG. 4. Any or all of the hardware shown in FIG. 15 may be incorporated in one or more of the wireless communication devices shown in FIG. 1.

A memory 606 is shown coupled to baseband module 605, which memory 606 may be utilized to store data, as well as program instructions that operate on baseband module 605. Various types of memory devices may be utilized for memory 606. It is to be noted that memory 606 may be located anywhere within device portion 600 and, in one instance, it may also be part of baseband module 605.

Transmitter 601 and receiver 602 are coupled to an antenna 604 via transmit/receive (T/R) switch module 603. T/R switch module 603 switches the antenna between the transmitter and receiver depending on the mode of operation. In other embodiments, separate antennas may be used for transmitter 601 and receiver 602, respectively. Furthermore, in other embodiments, multiple antennas or antenna arrays may be utilized with device 600 to provide antenna diversity or multiple input and/or multiple output, such as MIMO, capabilities.

At frequencies in the lower gigahertz range, omni-directional antennas provide adequate coverage for communicating between wireless devices. Thus, at frequencies about 2.4-5 GHz, one or more omni-directional antenna(s) is/are typically available for transmitting and receiving. However, at higher frequencies, directional antennas with beamforming capabilities are utilized to direct the beam to concentrate the transmitted energy, due to the limited range of the signal. In these instances, antenna arrays allow for directing the beam in a particular direction.

Outbound data for transmission from host unit 610 are coupled to baseband module 605 and converted to baseband signals and then coupled to transmitter 601. Transmitter 601 converts the baseband signals to outbound radio frequency (RF) signals for transmission from device 600 via antenna 604. Transmitter 601 may utilize one of a variety of up-conversion or modulation techniques to convert the outbound baseband signals to outbound RF signal. Generally, the conversion process is dependent on the particular communication standard or protocol being utilized.

In a similar manner, inbound RF signals are received by antenna 604 and coupled to receiver 602. Receiver 602 then converts the inbound RF signals to inbound baseband signals, which are then coupled to baseband module 605. Receiver 602 may utilize one of a variety of down-conversion or demodulation techniques to convert the inbound RF signals to inbound baseband signals. The inbound baseband signals are processed by baseband module 605 and inbound data is output from baseband module 605 to host unit 610.

LO 607 provides local oscillation signals for use by transmitter 601 for up-conversion and by receiver 602 for down-conversion. In some embodiments, separate LOs may be used for transmitter 601 and receiver 602. Although a variety of LO circuitry may be used, in some embodiments, a PLL is utilized to lock the LO to output a frequency stable LO signal based on a selected channel frequency.

It is to be noted that in one embodiment, baseband module 605, LO 607, transmitter 601 and receiver 602 are integrated on the same integrated circuit (IC) chip. Transmitter 601 and receiver 602 are typically referred to as the RF front-end or radio. In other embodiments, one or more of these components may be on separate IC chips. Similarly, other components shown in FIG. 15 may be incorporated on the same IC chip, along with baseband module 605, LO 607, transmitter 601 and receiver 602. In some embodiments, the antenna 604 may also be incorporated on the same IC chip as well. Furthermore, with the advent of system-on-chip (SOC) integration, host devices, application processors and/or user interfaces, such as host unit 610, may be integrated on the same IC chip along with baseband module 605, transmitter 601 and receiver 602.

Additionally, although one transmitter 601 and one receiver 602 are shown, it is to be noted that other embodiments may utilize multiple transmitter units and receiver units, as well as multiple LOs. For example, diversity communication and/or multiple input and/or multiple output communications, such as multiple-input-multiple-output (MIMO) communication, may utilize multiple transmitters 601 and/or receivers 602 as part of the RF front-end.

The utilization of a single receive (receiving) window (or a hybrid window) to perform concurrent scanning and initiating for BLE operations has a number of advantages, including lower power consumption and bandwidth efficiency. Lower power is obtained since only one receive window is used to provide both the initiating and scanning functions, instead of utilizing two receive windows. Bandwidth efficiency is obtained, because by allocating a period for only one window, time allocation which have been needed for the second window may be allocated to other functions or other devices in the network to transmit. The invention is applicable for BLE operations as specified in Version 4.0 of the Bluetooth specification. However, the invention need not be limited to the particular version of the Bluetooth specification. Furthermore, the invention may be readily adapted for use with other communication protocols or standards that utilize more than one receive window, wherein the invention reduces the number of receive windows utilized by a device by performing concurrent receiving operations.

Thus, concurrent scanning and initiation for BLE is described.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the present invention have been expressly described herein, other combinations of these features and functions are likewise possible. The present invention is not limited by the particular examples and embodiments disclosed herein and expressly incorporates these other combinations.

We claim:

1. A method comprising:
opening a receiving window in a device to receive a packet transmission according to a proximal wireless transmission protocol compliant with a Bluetooth Low Energy wireless specification;
using the receiving window to identify an address of the packet transmission to perform an initiating operation to connect to a remote device;
using the receiving window to identify an address of the packet transmission to perform a scanning operation; and
performing both the scanning operation and the initiating operation utilizing the same receiving window while the receiving window is open, instead of opening two receiving windows to perform separate scanning and initiating operations.

2. The method of claim 1, wherein the proximal wireless transmission protocol is based on a Bluetooth 4 specification.

3. The method of claim 1, further comprising for the device to communicate with a second remote device using a second wireless transmission protocol, once the receiving window closes.

4. The method of claim 1, wherein the packet transmission is part of an advertisement packet transmitted from a Bluetooth Low Energy wireless specification compliant device.

5. The method of claim 4, further comprising connecting to the remote device in a connection event transmitted from the Bluetooth Low Energy wireless specification compliant device.

6. The method of claim 5, wherein an address in the advertisement packet is compared to an entry in an initiating white list or an entry in a scanning white list.

7. The method of claim 5, wherein an address in the advertisement packet is compared to an entry in an initiating white list and an entry in a scanning white list.

8. A method comprising:
utilizing a LINK layer operation to open a receiving window in a device to receive a transmitted advertisement packet that is transmitted in accordance with a Bluetooth Low Energy wireless specification;
utilizing the LINK layer operation to identify an address of the advertisement packet when the receiving window is open to perform an initiating operation to connect to a remote device;
utilizing the LINK layer operation to identify an address of the advertisement packet when the receiving window is open to perform a scanning operation; and
performing both the scanning operation and the initiating operation utilizing the same receiving window while the receiving window is open, instead of opening two receiving windows to perform separate scanning and initiating operations.

9. The method of claim 8, wherein the advertisement packet is part of an advertising event transmitted from a Bluetooth Low Energy wireless specification compliant device.

10. The method of claim 9, further comprising connecting to the remote device in a connection event transmitted from the Bluetooth Low Energy wireless specification compliant device.

11. The method of claim 10, further comprising using a filtering list to compare a received address with addresses in the filtering list.

12. The method of claim 10, further comprising using an initiating white list and a scanning white list to compare a received address with address entries in at least one of the initiating or scanning white lists to filter for addresses.

13. The method of claim 12, wherein one filtering list is used and attributes are attached to entries in the one filtering list to identify if a particular entry belongs in one or both of the initiating white list and scanning white list.

14. An apparatus comprising:
a radio frequency front end to configured to function as a Physical (PHY) layer for wireless communication; and
a baseband module coupled to the radio frequency front end configured to function as a LINK layer for the wireless communication, the LINK layer configured to:

open a receiving window in a device to receive a transmitted advertisement packet that is transmitted in accordance with a Bluetooth Low Energy wireless specification;

identify an address of the advertisement packet when the receiving window is open to perform an initiating operation to connect to a remote device;

identify an address of the advertisement packet when the receiving window is open to perform a scanning operation; and perform both the scanning operation and the initiating operation utilizing the same receiving window while the receiving window is open, instead of opening two receiving windows to perform separate scanning and initiating operations.

15. The apparatus of claim 14, wherein the LINK layer is further configured to operates the apparatus as a Bluetooth Low Energy wireless specification compliant device and the advertisement packet is part of an advertising event transmitted from another Bluetooth Low Energy wireless specification compliant device.

16. The apparatus of claim 15, wherein the LINK layer is further configured to initiate a connection to the remote device in a connection event transmitted from the other Bluetooth Low Energy wireless specification compliant device.

17. The apparatus of claim 16, wherein the LINK layer is further configured to include a filtering list to compare a received address with addresses in the filtering list.

18. The apparatus of claim 16, wherein the LINK layer is further configured to include initiating a white list and a scanning white list to compare a received address with address entries in at least one of the initiating or scanning white lists to filter for addresses.

19. The apparatus of claim 18, wherein the LINK layer is further configured to include separate filtering lists for the initiating white list and scanning white list.

20. The apparatus of claim 18, wherein the LINK layer is further configured to include one filtering list with attributes attached to entries in the one filtering list to identify if a particular entry belongs in one or both of the initiating white list and scanning white list.

* * * * *